UNITED STATES PATENT OFFICE.

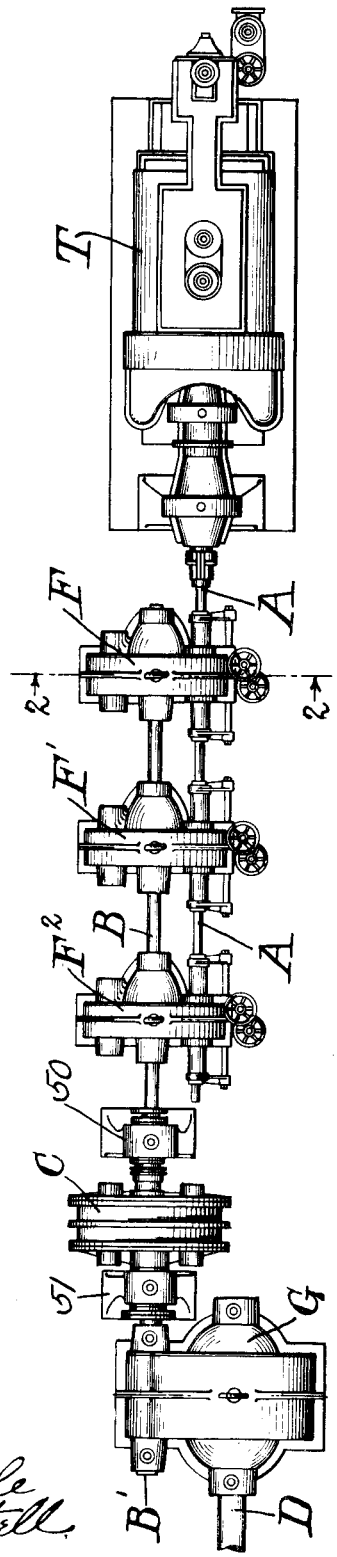

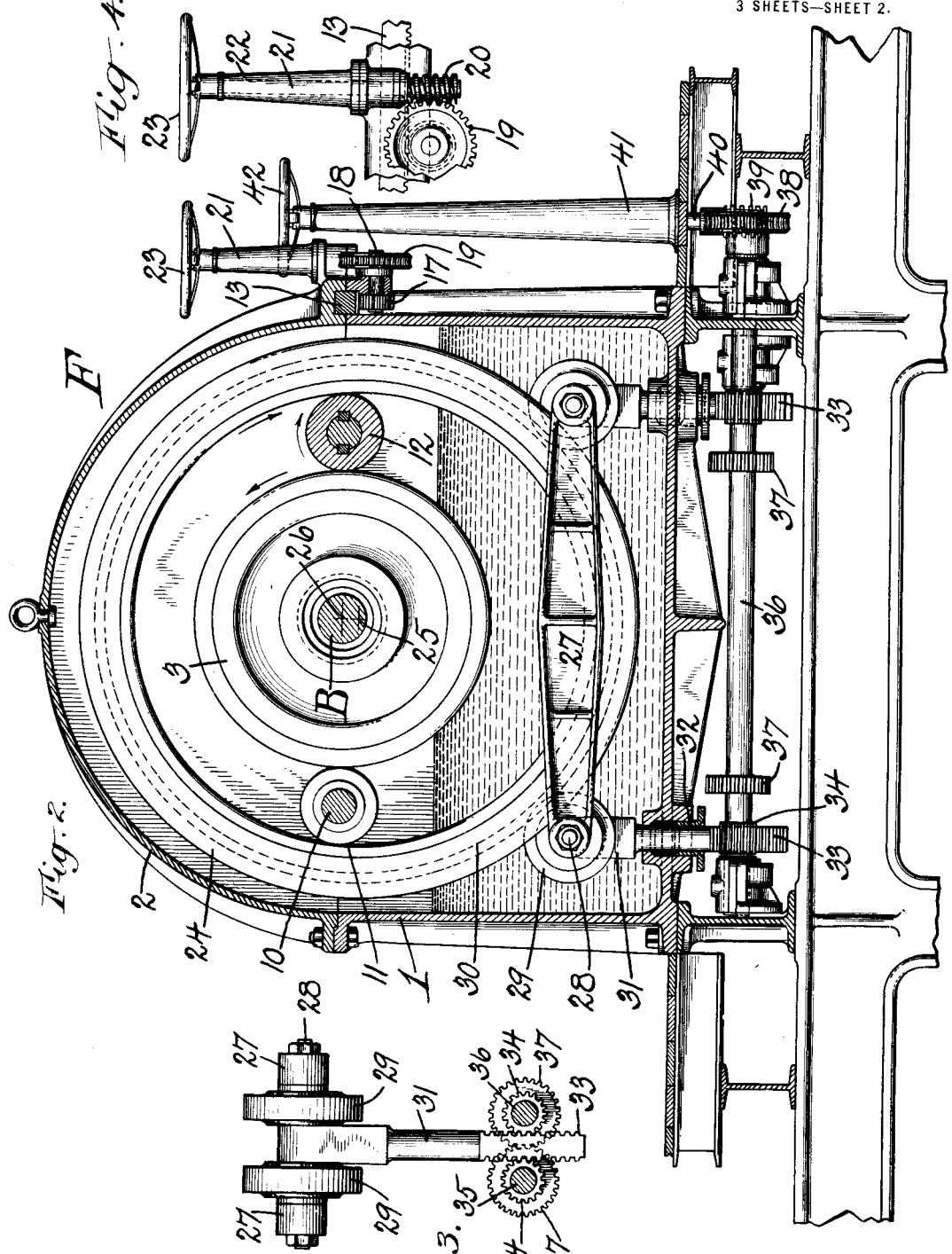

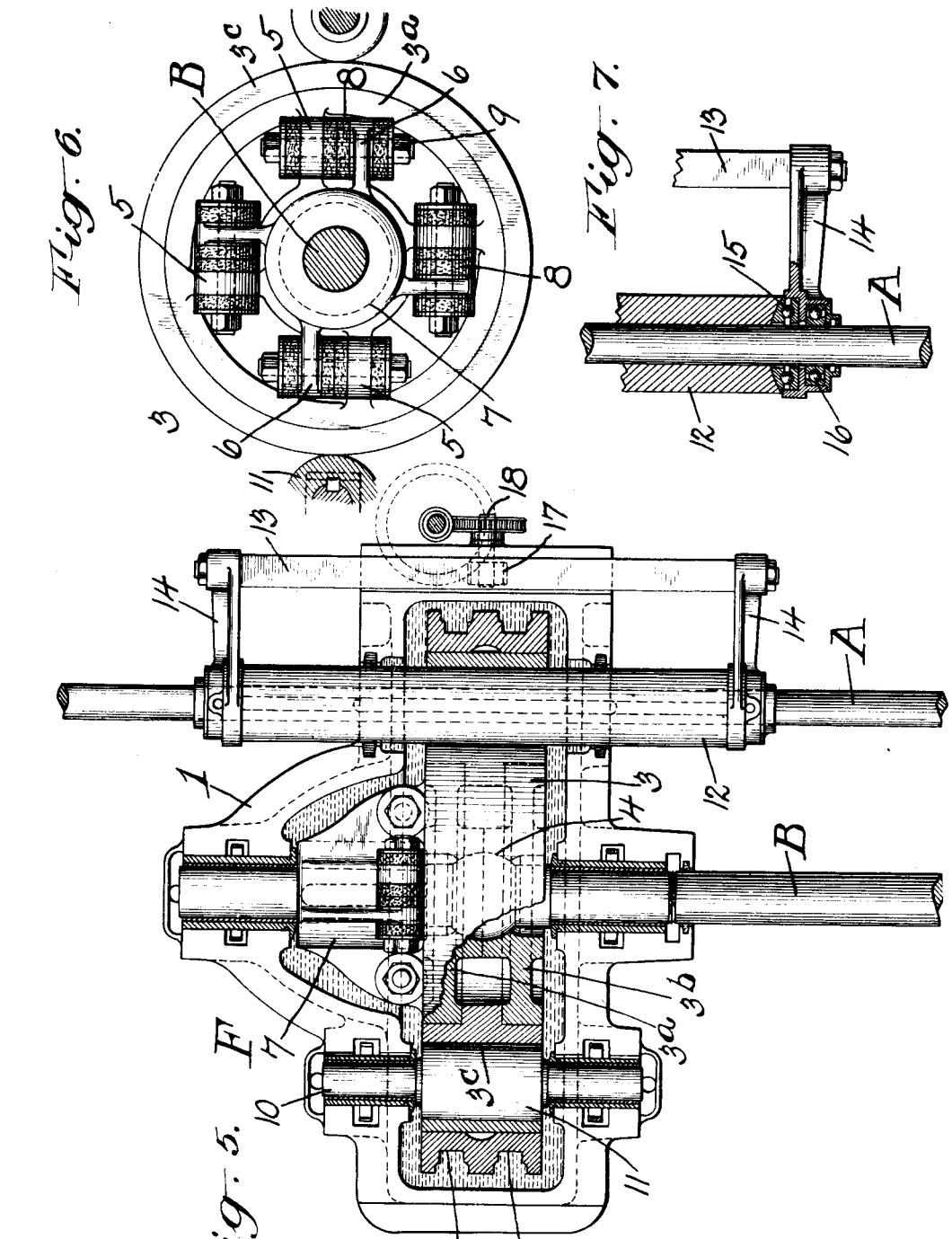

AUGUST SUNDH, OF HASTINGS-UPON-HUDSON, NEW YORK, ASSIGNOR TO OTIS ELEVATOR COMPANY, OF JERSEY CITY, NEW JERSEY, A CORPORATION OF NEW JERSEY.

POWER-TRANSMISSION MECHANISM.

1,185,952.     Specification of Letters Patent.     Patented June 6, 1916.

Application filed October 25, 1911. Serial No. 656,613.

*To all whom it may concern:*

Be it known that I, AUGUST SUNDH, a citizen of the United States, residing at Hastings-upon-Hudson, in the county of Westchester and State of New York, have invented a new and useful Improvement in Power-Transmission Mechanism, of which the following is a specification.

My invention relates to power transmitting mechanism particularly adapted for use in power units and for reduction from a high to a low speed. It may be used, for example, in transmitting power from a high speed steam turbine to a driven element such as a ship's propeller, a winding drum for inclined railways, a mine hoist, etc.

An object of the invention is to provide means for transmitting such power with efficiency and with a small amount of noise, wear and vibration of the transmitting apparatus.

A further object of the invention is to combine in a transmitting mechanism a plurality of devices, any one of which may be used alone to transmit the power, and the others being so arranged that they may be readily substituted in case of a break down or defect of the one in use.

Other objects of the invention and the exact nature thereof will appear more fully hereinafter.

Referring to the accompanying drawings, Figure 1 is a plan view of mechanism embodying my invention; Fig. 2 is a sectional elevation view of a friction speed reduction device, substantially as indicated by the section line 2—2 of Fig. 1; Fig. 3 is a detail view of a portion of a device for lifting the friction driving ring (Fig. 2) out of operative position; Fig. 4 is a detail view of gearing for adjusting a friction roller 12; Fig. 5 is a part sectional plan view of mechanism shown in Fig. 2; Fig. 6 is an elevation view of an elastic coupling used in connection with the gearing shown in Fig. 5; Fig. 7 is a fragmentary view showing ball bearings for a friction driving roller.

The general arrangement of the apparatus is shown in Fig. 1, and comprises a high speed steam turbine engine T, a drive shaft A coupled thereto, an intermediate shaft B, and a plurality of speed reduction devices F, F', F², each of which comprises speed reduction friction gearing, adapted to transmit power from the shaft A to the shaft B and operate the latter at a reduced speed. Only one of these reduction devices is ordinarily in operation at one time, but the others, are so arranged that they may be readily and quickly substituted in case of any defect or breakage in the apparatus. The shaft B is connected through a fluid clutch coupling or slip device C to a shaft B' in alinement with the shaft B. A spur gear device G serves to transmit the power to a driven shaft D with a further reduction in the speed. The shaft D is connected to the mechanism which it is desired to operate, such as a mine hoist, a ship's propeller or other device.

The speed reduction device F is fully illustrated in Figs. 2 to 7, inclusive, and will now be described. The friction gears are inclosed in a casing 1, comprising a removable cover section 2. The intermediate shaft B extends through the casing and has suitable bearings in the walls of the casing. Loosely mounted on the shaft B is a friction roller 3 comprising a hub or body portion consisting of separate sections 3ª and 3ᵇ and an annular member or ring 3ᶜ. The shaft B has a spherical enlargement 4 forming a bearing for the friction roller 3. The section 3ª of the friction roller is formed with integral lugs 5 opposite corresponding lugs 6 formed on a sleeve 7 keyed to the shaft B. Disks or washers 8 of some suitable elastic or resilient material, such as hard rubber, are placed between the lugs 5 and 6 and also on the outer faces of the lugs. Bolts 9 extend through said lugs 5 and 6 and washers 8, and secure the parts together, the washers preferably being placed under suitable compression by the bolts. This arrangement forms a yieldable connection between the shaft B and the friction roller 3, the spherical bearing of the roller on the shaft, combining with said yielding connection to permit the roller to adjust itself as may be necessary to properly contact with the coöperating friction rollers. A stub shaft 10 is adjustably journaled in the casing 1 and has secured thereto or formed integral therewith a roller 11 adapted to run in frictional contact with the roller 3. Opposite the roller 11 is another roller 12 splined on the drive shaft A so as to be movable longitudinally thereon. The roller 12 extends through the casing 1 and has a considerable range of movement longitudinally of the shaft A. The purpose of this is to permit adjustment of the roller and thereby prevent the wear of the surface in contact with the roller 3, and in case such wear does develop to permit the roller 12 to be shifted and thereby bring a new and true surface in engagement with the roller 3.

The mechanism for adjusting the roller 12 comprises a rack bar 13 and arms 14 secured to the ends of the rack bar. The inner ends of these arms are journaled on the drive shaft A and are provided with end thrust bearings for the roller 12. Bearing balls 15 are interposed between the arms 14 and the roller 12 to take up the end thrust of the roller. Bearing balls 16 take up the lateral thrust or weight of the arms on the drive shaft. A rack bar 13 is guided in a recess formed in the cover section 2 of the casing as shown in Fig. 2. Engaging with the rack bar 13 is a pinion 17 secured to a stud shaft 18 having a bearing in the lower section of the casing 1. A worm wheel 19 is secured to the shaft 18 and coöperates with a worm 20 on the lower end of a vertical shaft 21 which extends through a standard 22 mounted on the casing. A hand wheel 23 is connected to the upper end of the shaft 21. When the hand wheel 23 is rotated, the motion is transmitted through the worm gearing and rack and pinion, thereby moving the roller 12 longitudinally and adjusting its position with respect to the coöperating roller 3.

An annular friction driving roller or ring 24 is located within the casing 1 and surrounds the rollers 3, 11 and 12. This ring by its weight serves to hold the rollers 11 and 12 in frictional contact with the central roller 3. It will be observed that the inner bearing surface of the ring 24 is of such diameter that the ring assumes a position eccentric to the roller 3. In other words the axis 25 of the ring is below the axis 26 of the roller 3 and shaft B. The weight of the ring 24 is supported by the rollers 11 and 12, and owing to the points at which the pressure is applied to said rollers, that is, only a short distance above their horizontal diameters, the resulting inward pressure of said rollers against the central roller 3 is considerably greater than the weight of the ring. In other words there is a sort of wedge action, the rollers 11 and 12 being wedged in between the ring 24 and roller 3. The driving roller 12 is therefore held in close frictional engagement with the roller 3 and with sufficient pressure to prevent any material loss of power by slippage between the rollers.

In order to lift the ring 24 out of engagement with the rollers 11 and 12, the following mechanism is employed: In the lower part of the casing 1 is a frame comprising horizontal beams 27 connected at their ends by bearing shafts 28 on which are mounted rollers 29. The latter are adapted to engage in peripheral grooves 30 formed in the ring 24. Rods 31 are connected to the shafts 28 between the rollers 29 and extend vertically downward through openings formed in the bottom of the casing 1. Packing glands 32 are provided to prevent the escape of oil from the casing through said openings. The lower end of each rod 31 is in the form of a rack bar provided with rack teeth 33 on opposite sides of the bar. Pinions 34 in mesh with said rack teeth are mounted on a pair of horizontal rollers 35 and 36. The roller 36 which may be termed a driving roller is operated by mechanism presently to be described. Pairs of intermeshing pinions or spur gears 37 are secured to the rollers 35 and 36 to transmit power from the roller 36 to the roller 35. The rollers 35 and 36 are suitably journaled in bearings beneath the casing. Keyed to the outer end of the drive roller 36 is a worm wheel 38 in mesh with a worm 39 on the lower end of a vertical shaft 40. The latter extends upward through a standard 41 and is connected to a hand wheel 42. By rotating the hand wheel 42 the worm gearing and racks and pinions just described may be operated in a direction to carry the rollers 29 upward into contact with the ring 24 and lift the latter out of engagement with the friction driving wheels 11 and 12.

The construction and operation of the speed reduction devices F' and F² are substantially like that of the device F, and therefore need no further description. It will now be apparent that any one or more of these devices may be used to transmit power from the drive shaft A to the intermediate shaft B, and in the event of either one or more of the devices being rendered inoperative, through breakage or from any other cause, the others may be brought into use, so that the mechanism will not be completely disabled. Such an arrangement is of especial value where the mechanism is used on steamships or any other places where it is important that the mechanism remain in working condition throughout an extended period of time. Ordinarily only one of these units at a time will be required to transmit the power, although in some instances, as where a heavy duty is required, it may be desirable to have two or more of them in operation at the same time.

It will be understood that various modifications in the details of construction and arrangement of parts might be made without departing from the spirit and scope of the invention. I wish therefore not to be limited to the particular construction and arrangement herein set forth.

What I claim as new and desire to secure by Letters Patent of the United States is:

1. The combination of an inner friction roller, outer rollers located on opposite sides of said inner roller and in frictional contact therewith, a rotatable ring surrounding and in contact with the said outer rollers, and means for lifting and lowering said ring out of and into contact with said outer rollers.

2. The combination of an inner friction roller, outer friction rollers on opposite sides of the inner roller, a ring surrounding said rollers, and normally supported by said outer rollers with its axis below the axes of the rollers and a device for lifting the ring out of engagement with the rollers.

3. The combination of a train of gears in frictional contact, a rotatable ring surrounding said gears, and means for moving the ring out of engagement with the rollers.

4. The combination of a train of friction rollers, a rotatable ring surrounding said rollers and holding them in frictional driving engagement, and means for moving the ring out of operative position.

5. The combination of rollers in frictional rolling contact, a ring surrounding the rollers, a lifting frame, rollers carried thereby, and means to lift said frame into position to support the said ring on said last-named rollers.

6. The combination of a casing, friction gears therein, an annular rotatable member surrounding said gears and holding them in operative relation, a lifting device within the casing and adapted to lift said annular member out of operative position, and means located externally of the casing for operating said lifting device.

7. The combination of a casing, a drive shaft, a friction roller within the casing, a shaft on which said roller is mounted, a roller mounted on the drive shaft, and in frictional engagement with said first-named rollers, means comprising a ring or annular member rotatable within the casing and holding said rollers in frictional contact, a lifting device within the casing in position to engage and lift said ring, and mechanism located outside of the casing for operating said lifting device.

8. In combination, a casing, friction gears therein, a ring surrounding said gears, a lifting frame, anti-friction rollers carried thereby and adapted to engage and lift said ring, depending members connected to said frame and extending through the bottom of the casing, and means geared to said members for operating them to lift and lower the said frame.

9. The combination of a liquid-tight casing, a drive shaft extending therethrough, a friction roller mounted on said shaft and adjustable longitudinally thereon, means for adjusting said roller, and a second friction roller mounted within the casing and in rolling contact with said first named roller.

10. The combination with a shaft, of a friction wheel mounted thereon for universal movement, means forming a yieldable driving connection between the shaft and said wheel, friction rollers in contact with said wheel, and a ring surrounding and supported by said friction rollers.

11. The combination with a shaft, a friction wheel mounted thereon and having a self adjustable connection with the shaft, friction rollers engaging said wheel and a ring surrounding and supported by said rollers.

In testimony whereof, I have signed my name to this specification in the presence of two subscribing witnesses.

AUGUST SUNDH.

Witnesses:
JAMES G. BETHELL,
J. F. RULE.